United States Patent Office 2,949,485
Patented Aug. 16, 1960

2,949,485

QUATERNARY AMMONIUM SALTS OF 2,2-DI-PHENYL ETHYL—AMINO ETHYL ETHERS

William Oroshnik, Plainfield, N.J., and Alexander D. Mebane, New York, N.Y., assignors to Ortho Pharmaceutical Corporation, a corporation of New Jersey No Drawing. Filed Jan. 29, 1957, Ser. No. 636,865

11 Claims. (Cl. 260—567.6)

This invention relates to compounds of the general formula

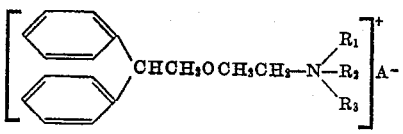

in which $R_1$ and $R_2$ are alkyl radicals having less than four carbon atoms which together may form a piperidinium ring, $R_3$ is selected from the group consisting of lower alkyl, lower hydroxyalkyl, lower alkenyl, and benzyl radicals, and A is an anion.

The new compounds of the present invention possess a high degree of antispasmodic activity.

It is difficult to distinguish between antispasmodic and antihistaminic substances. Either will relieve or prevent spasm resulting from histamine. The compounds of the present invention, however, exert their anispasmodic effect in a highly specific manner at low concentrations and their antihistaminic effect is slight or insignificant. The ethers of the present invention are more active than the closely related ester type antispasmodic 2-diethylaminoethyl diphenylacetate hydrochloride. The longer-lasting therapeutic effect of our novel ethers is probably due to the stability of the ether linkage to hydrolysis.

Antispasmodic activity is achieved by a direct action on smooth muscle, by counteracting acetlycholine, by antagonizing histamine, or any combination of these activities. Atropine is undoubtedly the most potent anticholinergic antispasmodic, but its use is accompanied by untoward side-effects. The same is true of Papaverine as an antihistaminic spasmolytic agent. The many antispasmodics on the market represent compromises in having some fraction of direct, anticholinergic, or antihistaminic activity at a level where side-effects are minimal. Most antispasmodics, however, require a large dosage and have a modest therapeutic index.

The compounds of the present invention have been found to be potent antispasmodics with a high therapeutic index. They have elements of anticholinergic action, but without detracting side-effects. There is some evidence for mild ganglionic blocking in their experimental pharmacology.

The compounds generally may be prepared by reacting an alkali metal salt of 2,2-diphenylethanol of the formula

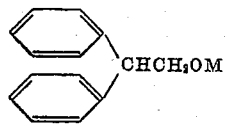

in which M is an alkali metal, preferably sodium, with an aminoethyl halide

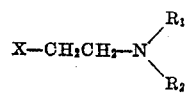

in which $R_1$ and $R_2$ have the values noted above and X is a halide atom, to produce an amino ether. This amino ether is then treated with an organic halide, sulfate, or sulfonate. The organic radical may be an alkyl radical of less than seven carbon atoms. Examples of organic halides found to be satisfactory are the alkyl halides such as hexyl and butyl bromide, and the alkenyl halides such as allyl chloride. Such saturated and unsaturated alkyl groups having less than seven carbon atoms in the hydrocarbon chain will be referred to throughout the specification and claims as "lower alkyl" and "lower alkenyl" radicals.

The following specific examples of the preparation of compounds of the present invention are illustrative.

EXAMPLE I

*Methyl diethyl 2-(2,2-diphenylethoxy)ethyl ammonium bromide*

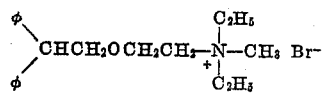

(a) 2,2-DIPHENYLETHANOL

One liter of anhydrous ether and 36 g. (0.94 mole) of lithium aluminum hydride are placed in a 5-liter, 3-neck flask fitted with an efficient reflux condenser. This mixture is mechanically stirred rapidly in an ice bath, while a solution of 200 g. (0.94 mole) of diphenylacetic acid in 1800 cc. of dry ether is added during a period of 15 minutes. After stirring and refluxing the mixture overnight, the flask is chilled and 90 cc. of ethyl acetate is added slowly, followed by 750 cc. of saturated aqueous tartaric acid solution. The two layers are separated and the lower layer is re-extracted with 600 cc. of ether. The combined ether extracts are washed first with 10% sodium hydroxide solution, then twice with water. The extract, after drying over anhydrous potassium carbonate, is filtered and concentrated under vacuum. The product (199 g.) is a waxy crystalline solid, which still contains a few percent of solvent. The product may be further purified by vacuum distillation.

(b) 2-(2,2-DIPHENYLETHOXY) TRIETHYLAMINE

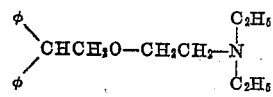

In a 5-liter, 3-neck flask equipped with a stirrer are placed 180 g. (0.91 mole) of molten 2,2-diphenylethanol and 2500 cc. of thiophene-free benzene. The solution is mechanically stirred and brought to a boil (hood) to expel any water present. A reflux condenser is then attached, and 24 g. (1 mole) of commercial sodium hydride is added. The mixture is stirred at reflux temperature for 17 hours while protected by a soda-lime-Drierite tube. To the light brown suspension so obtained is added 400 cc. of a benzene solution containing 136 g. (1 mole) of 2-diethylaminoethyl chloride (prepared from the commercially-available hydrochloride in the manner described by David Shirley, Preparation of Organic Intermediates, Wiley (1951), page 117). Stirring and refluxing are continued for five hours during which time a gelatinous suspension of sodium chloride appears. Ice is then added to the mixture, followed by one liter of half-saturated brine. The aqueous layer is discarded and the benzene layer washed with water. A small nigre layer is drawn off and extracted with ether. The ether extract is added to the benzene layer.

The light-orange benzene-ether solution is then extracted with 850 cc. of 10% aqueous hydrochloric acid and re-extracted three times with 300-cc. portions of 3% hydrochloric acid. The yellow acidic extract is then neutralized with 250 cc. of 25% aqueous sodium hydroxide solution and extracted with 1000 cc. of ether. A second extract with 400 cc. of ether is made after adding a further 50 cc. of 25% sodium hydroxide solution to the aqueous phase. The combined ethereal extract, after drying over anhydrous potassium carbonate, is then filtered with 2 tablespoons of decolorizing carbon and concentrated from a hot-water bath under vacuum. Any remaining diethylaminoethyl chloride is removed by heating to a temperature of 100° C. at a pressure of 0.5 mm. The product so obtained (245 g.) is an orange-yellow oil. It may be distilled, collecting at 138–143°/0.12 mm. The distillate is a yellow oil: $n_D^{29}=1.5371$.

(c) METHYL DIETHYL 2-(2,2-DIPHENYLETHOXY) ETHYL AMMONIUM BROMIDE

Twenty grams of the undistilled product, 2-(2,2-diphenylethoxy) triethylamine, is mixed with 1 cc. of methanol and 80 cc. of U.S.P. ether in a 200-cc. heavy-walled flask. To the solution is added 6 cc. of liquid methyl bromide, and the flask is stoppered. After 20 hours at room temperature, the supernatant liquid is decanted from the crystalline crude methobromide. The sticky crystals are dissolved in 100 cc. of boiling methylethyl ketone and filtered while hot with a little decolorizing carbon and chilled with seeding at —5° C. for three days. The supernatant is decanted and the crystalline solid, after washing with methylethyl ketone, is placed in a vacuum desiccator. Eighteen and a half grams of nearly-white non-hygroscopic crystals are obtained. Melting point (when slowly heated): 123.5–125.5° C.

EXAMPLE II

Triethyl 2-(2,2-diphenylethoxy)ethyl ammonium iodide

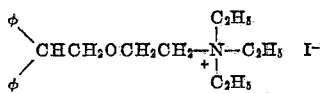

A mixture of 5 g. of 2-(2,2-diphenylethoxy)triethylamine (prepared as in section (b), Example I), 40 cc. of ether, 1 cc. of isopropyl alcohol, and 2 cc. of ethyl iodide is kept at room temperature for six days. The precipitated ethiodide is filtered off with ether rinses and oven-dried, yielding 4.0 g. of yellowish-white crystalline granules having a melting point of 120–130° C. Recrystallization from acetone+ether gives sparkling white leaflets, non-hygroscopic, and having a melting point of 128–130° C.

EXAMPLE III

Diethyl isopropyl 2-(2,2-diphenylethoxy)ethyl ammonium bromide

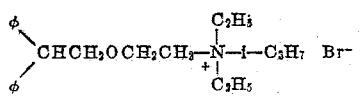

A mixture of 3 g. of 2-(2,2-diphenylethoxy)triethylamine, 2 cc. of isopropyl bromide, and 15 cc. of methanol is heated at 80° C. in a pressure flask for two days. The solvent is evaporated and the viscous syrup crystallized at —5° C. from a little acetone+ether, yielding 0.3 g. of druses, having a melting point of 119–120° C.

EXAMPLE IV

Allyl diethyl 2-(2,2-diphenylethoxy)ethyl ammonium bromide

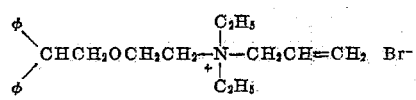

A mixture of 3 g. of 2-(2,2-diphenylethoxy)triethylamine, 2 cc. of allyl bromide, and 15 cc. of methanol is heated at 50° C. for 17 hours. The solvent is evaporated under vacuum, and the residue recrystallized from 25 cc. acetone yielding 3.6 g. of colorless, non-hygroscopic prisms having a melting point of 121–123° C.

EXAMPLE V

Benzyl diethyl 2-(2,2-diphenylethoxy)ethyl ammonium chloride

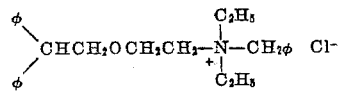

A mixture of 5.1 g. of 2-(2,2-diphenylethoxy)triethylamine, 3 cc. of benzyl chloride, 1 cc. of isopropylalcohol and 40 cc. of ether is allowed to stand for two weeks while the ether evaporates. The residue gradually becomes crystalline. Recrystallization from 20 cc. secondary butyl alcohol, 70 cc. acetone, and 80 cc. ether gives 5.8 g. of snow-white crystalline powder having a melting point of 184–186° C. A second recrystallization gives diamond-shaped plates having a melting point of 186–189° C.

EXAMPLE VI

Diethyl 2-hydroxyethyl 2-(2,2-diphenylethoxy)ethyl ammonium bromide

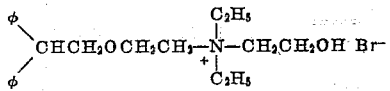

A mixture of 5 g. of 2-(2,2-diphenylethoxy)triethylamine, 2.5 g. of 2-bromoethanol, and 20 cc. of acetone is allowed to stand at room temperature for three days. The mixture is then heated to boiling, and ether (50 cc.) added to turbidity, chilled for 17 hours, decanted, washed with cold acetone+ether, and vacuum-dried. The resultant product (1.6 g.) is drusy and has a melting point of 126–127° C.

EXAMPLE VII

Trimethyl 2-(2,2-diphenylethoxy)ethyl ammonium bromide

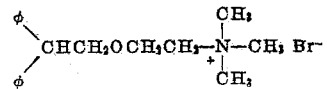

(a) 2-(2,2-DIPHENYLETHOXY)ETHYL DIMETHYLAMINE

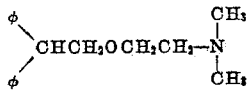

In a 1-liter, 3-neck flask with stirrer and reflux condenser is placed 20 g. (0.1 mole) of molten diphenylethanol, 200 cc. of thiophene-free benzene, and 3.0 g. (0.125 mole) of commercial sodium hydride. The mixture is stirred at reflux temperature for 17 hours and to the suspension of the sodium salt so obtained is added 15 g. of 2-dimethylaminoethyl chloride dissolved in 15 g. of toluene. (The 2-dimethylaminoethyl chloride is obtained from the commercially-available hydrochloride by the procedure of Burtner, Journal of the American Chemical Society, 71 (1949), 2578.) Refluxing is continued with stirring for an additional 17 hours. Ice and half-saturated brine (150 cc.) are then added and the aqueous layer is discarded. The product is isolated from the benzene layer by extraction with 300 cc. of 5% aqueous hydrochloric acid followed by three additional extracts with 50-cc. portions of 3% hydrochloric acid. The aqueous acidic extract is then neutralized with 40 cc. of 25% aqueous sodium hydroxide and extracted twice with 100-cc. portions of ether. The combined ethereal extract is dried over anhydrous potassium carbonate, filtered, and concentrated from a boiling-water bath under a final vacuum of 0.5 mm. In this manner, 20.7 g. of clear pale-yellow oil is isolated.

(b) TRIMETHYL 2-(2,2-DIPHENYLETHOXY)ETHYL AMMONIUM BROMIDE

To 10.3 g. of the free base prepared as described in section (a) of this example, dissolved in 100 cc. of ether and 1 cc. of methanol, 4 cc. of liquid methyl bromide is added, and the flask stoppered. An oil comes out which quickly crystallizes. After several hours at room temperature, the mixture is chilled to −5° C. The supernatant is decanted and the crude methobromide evacuated at 60°/0.5 mm. to give 13.6 g. of pinkish-white crystalline powder. This is recrystallized from 1 cc. methanol, 150 cc. acetone, and 100 cc. ether, chilling at −5° C. before filtering, and oven- and vacuum-dried to give 11.5 g. of sparkling white flakes, non-hydrogroscopic, and melting at 137–142° C.

EXAMPLE VIII

*Dimethyl ethyl 2-(2,2-diphenylethoxy)ethyl ammonium bromide*

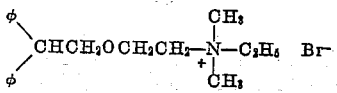

A mixture of 6.9 g. of 2-(2,2-diphenylethoxy)ethyl dimethylamine, 3 cc. of ethyl bromide, and 10 cc. of isopropylalcohol in a pressure flask is heated for 67 hours at 50° C. Evacuation at 100° C./0.2 mm. gives a quickly-crystallizing syrup, which is recrystallized from 90 cc. of acetone and 30 cc. of ether. Eight and two-tenths grams of white, fluffy, non-hygroscopic microprisms having a melting point on slow heating of 103.5–104° C. are obtained.

EXAMPLE IX

*Dimethyl propyl 2-(2,2-diphenylethoxy)ethyl ammonium bromide*

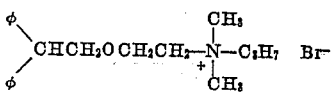

A mixture of 3 g. of 2-(2,2-diphenylethoxy)ethyl dimethylamine, 2 g. of n-propyl bromide, and 25 cc. of methanol in a pressure flask is heated for 24 hours at 50° C. Evacuation gives a syrup, which is precipitated again from acetone with ether, and yields 4.1 g. of soft resin which does not crystallize.

EXAMPLE X

*Dimethyl isopropyl 2-(2,2-diphenylethoxy)ethyl ammonium iodide*

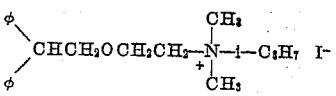

A mixture of 3 g. of 2-(2,2-diphenylethoxy)ethyl dimethylamine, 2 g. of isopropyl iodide, and 25 cc. of methanol in a pressure flask is heated for 24 hours at 50° C. Evacuation gives a syrup, which is precipitated again from acetone with ether. The reprecipitated crude product (2.7 g.), is taken up in acetone+ether and chilled at −5° C., and gives 0.6 g. of small white non-hygroscopic needles having a melting point of 117.5–118.5° C.

EXAMPLE XI

*Dimethyl isoamyl 2-(2,2-diphenylethoxy)ethyl ammonium bromide*

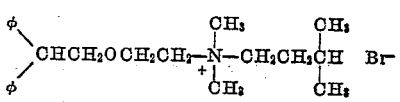

A mixture of 3.0 g. of 2-(2,2-diphenylethoxy)ethyl dimethylamine, 2 g. of isoamyl bromide, and 25 cc. of methanol in a pressure flask is heated for 24 hours at 50° C. Evacuation gives a syrup. The product is ether-soluble, and is reprecipitated from acetone with pentane, yielding a syrup which slowly crystallizes to a waxy solid. Recrystallization from a little acetone gives 2.2 g. of hygroscopic off-white crystalline curds, of a soapy but dry consistency having a melting point of 93–96° C.

EXAMPLE XII

*Allyl dimethyl 2-(2,2-diphenylethoxy)ethyl ammonium bromide*

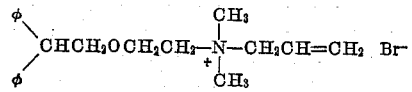

A mixture of 3.0 g. of 2(2,2-diphenylethoxy)ethyl dimethylamine, 2 g. of allyl bromide, and 25 cc. of methanol in a pressure flask is heated for 24 hours at 50° C. Evacuation gives a syrup, which is precipitated again from acetone with ether. The reprecipitated crude product crystallizes in large prisms. Recrystallization from acetone+ether gives 3.6 g. of white prisms having a melting point of 52–54° C.

EXAMPLE XIII

*Dimethyl 2-hydroxyethyl 2-(2,2-diphenylethoxy)ethyl ammonium bromide*

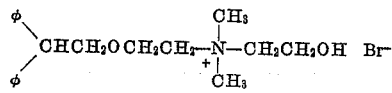

A mixture of 3.0 g. of 2-(2,2-diphenylethoxy)ethyl dimethylamine, 2 g. of 2-bromoethanol, and 25 cc. of methanol in a pressure flask is heated for 24 hours at 50° C. On evacuation, the residue crystallizes and recrystallization from acetone+ether gives 4.2 g. of white microcrystalline powder having a melting point of 145.5–148.5° C.

EXAMPLE XIV

*Methyl diisopropyl 2-(2,2-diphenylethoxy)ethyl ammonium bromide*

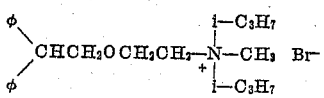

(a) 2-DIISOPROPYLAMINOETHYL CHLORIDE

One mole of diisopropylamine is stirred and refluxed for 17 hours with one mole of ethylene chlorohydrin in a 1-liter flask. The starting materials are removed under vacuum and 48 cc. (⅔ mole) of thionyl chloride is added to the hot semi-crystalline syrup with stirring (in a fume hood) over a period of seven minutes. Heating and stirring of the mixture is continued over a period of 40 minutes, during which time a temperature of 110° is reached and effervescence nearly ceases. This mixture is transferred with methanol rinses to a 1-liter suction flask and evacuated at 100° C. to 20 mm. The dark brown crystalline residue is recrystallized from acetone (qs. 600 cc.) to give about 82 g. of light brown crystals melting at 118–127° C.

To 20 g. of this hydrochloride in a separatory funnel is added 100 cc. of ethyl butyl ether, 60 cc. of ice, and a strong aqueous solution of 5 g. of sodium hydroxide. The ethereal layer is separated and the aqueous layer is extracted with an additional 40 cc. of ether. The combined ether extracts are dried over Drierite, filtered, and used in section (b) of this example.

(b) 2-(2,2-DIPHENYLETHOXY)ETHYL DIISOPROPYL-AMINE

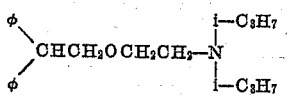

Fifteen and a half grams (0.077 mole) of 2,2-diphenylethanol and 200 cc. of ethyl butyl ether are stirred and refluxed for 17 hours with 2.3 g. (0.096 mole) of commercial sodium hydride. To this is added the ether extract described in section (a) of this example, and refluxing is continued for an additional 17 hours. The desired product is isolated by the method outlined in Example I(b), using quantities one-tenth as large as those there specified. The yield is 20.6 g. of yellow oil.

(c) METHYL DIISOPROPYL 2-(2,2-DIPHENYLETHOXY)-ETHYL AMMONIUM BROMIDE

A mixture of 10.3 g. of 2-(2,2-diphenylethoxy)ethyl diisopropylamine and 4 cc. of methyl bromide in 75 cc. of ether and 1 cc. of methanol is allowed to stand together in a closed flask for seven days. The liquid is decanted off and the crude product is digested with boiling acetone, chilled at −5° C. for 17 hours, and the supernatant liquid decanted. Three and seven-tenths grams of nearly white prisms decomposing at 169–171° C. are obtained which, upon recrystallization from acetone, melt at 172–174° C.

EXAMPLE XV

*1-methyl-1-(2-[2,2-diphenylethoxy]ethyl) piperidinium bromide*

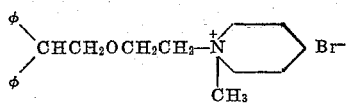

(a) 1-(2-CHLOROETHYL)PIPERIDINE

A mixture of 194 g. (1.5 moles) of commercially-available 2-piperidinoethanol and 450 cc. of chloroform in a 2-liter, 3-neck flask is stirred (in hood) with ice-cooling, while passing gaseous hydrogen chloride over its surface. When the pH becomes acidic, 127 cc. (1.73 moles) of thionyl chloride is run in. The mixture is stirred and refluxed for four hours, then chilled for two hours at −5° C., and filtered. The pinkish-white flakes of 2-chloroethylpiperidine hydrochloride, after oven-drying, weigh 214 g. (77%). A second crop of 35 g. can be obtained.

Ninety-two grams (0.5 mole) of this is shaken with 100 cc. cold benzene and 125 cc. cold 20% aqueous sodium hydroxide. The lower layer is re-extracted with 50 cc. benzene. The combined benzene extracts are water-washed, dried over potassium carbonate, and immediately used for further reaction.

(b) 1-(2-[2,2-DIPHENYLETHOXY]ETHYL) PIPERIDINE

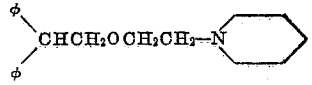

In a 1-liter, 3-neck flask equipped with a stirrer and reflux condenser are placed 19.8 g. (0.1 mole) of 2,2-diphenylethanol, 300 cc. of dry tetrahydrofuran, and 2.9 g. (0.12 mole) of sodium hydride. The mixture is stirred under reflux temperature for three hours, and to the red solution is added 53 cc. of a benzene solution containing 0.13 mole of the 2-chloroethylpiperidine. Stirring and refluxing are continued for 17 hours. The bulk of the tetrahydrofuran is distilled off, 150 cc. of ether and 100 cc. of half-saturated brine are added, and the aqueous layer is re-extracted with 75 cc. of ether. The combined ethereal extracts are then extracted with 220 cc. of 5% aqueous hydrochloric acid followed by 60 cc. of 3% hydrochloric acid. The acidic extract is neutralized with 25 cc. of 25% aqueous sodium hydroxide solution, and extracted with 150-cc. and 50-cc. portions of ether. The combined ethereal extract, after drying over anhydrous potassium carbonate, is filtered and concentrated, from a boiling-water bath, to a final pressure of 0.15 mm.; and 25.7 g. of orange oil is obtained.

(c) 1-METHYL-1-(2-[2,2-DIPHENYLETHOXY]ETHYL) PIPERIDINIUM BROMIDE

To a solution of 9.2 g. of the free base 1-(2-[2,2-diphenylethoxy]ethyl) piperidine in 70 cc. of ether and 1 cc. of methanol is added 3 cc. of liquid methyl bromide, and the stoppered flask is allowed to stand for 18 hours. The ether is decanted and the ether-washed solid is vacuum-dried to give 10.7 g. of pinkish-white flaky powder, having a melting point of 142–148° C. This is dissolved in 40 cc. of hot isopropyl alcohol and 60 cc. of acetone, filtered at the boiling point and 200 cc. ether added, and chilled for three hours at −5° C. before decanting the supernatant and vacuum-drying. Eight and four-tenths grams of peach-tinted, non-hygroscopic plates are obtained which have a melting point of 143–147° C. when slowly heated.

EXAMPLE XVI

*1-ethyl-1-(2-[2,2-diphenylethoxy]ethyl) piperidinium bromide*

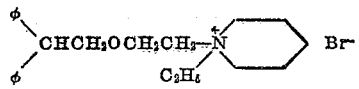

Nine and two-tenths grams of 1-(2-[2,2-diphenylethoxy]ethyl) piperidine, prepared as in section (b) of Example XV, is mixed with 70 cc. of ether, 1 cc. of methanol, and 5 cc. of ethyl bromide in a pressure flask. The flask is stoppered and heated for 67 hours at 45° C. On cooling, the ethobromide precipitates as 4-mm. prisms, which are recrystallized from 25 cc. of isopropyl alcohol, 35 cc. of acetone, and 30 cc. of ether to give 2.3 g. of non-hygroscopic, peach-tinted micro-prisms melting at 186–190° C.

The antispasmodic activity of the compounds prepared above has been demonstrated by their ability to inhibit gastro-intestinal activity, as measured by the advancement of an inert charcoal meal in a given period of time. The reduction in gastro-intestinal activity is proportional to the dosage, which is given in Table I as mg./kg. of body weight.

TABLE I

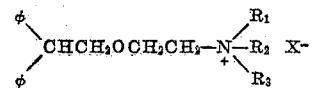

| $R_1$ | $R_2$ | $R_3$ | X | $ED_{50}$ (oral) | $LD_{50}$ (oral) | T.I. |
|---|---|---|---|---|---|---|
| Me | Me | Me | Br | 150 | 375 | 2.5 |
| Me | Me | Et | Br | >200 | <500 | ca. 2.0 |
| Me | Me | Pr | Br | 75 | 200 | 2.7 |
| Me | Me | i—Pr | I | 135 | 1000 | 7.4 |
| Me | Me | Allyl | Br | 165 | <500 | <3.0 |
| Me | Me | i—Am | Br | 190 | <500 | <2.6 |
| Me | Me | —CH$_2$CH$_2$OH | Br | 145 | 800 | 5.5 |
| Et | Et | Et | I | 150 | 800 | 5.3 |
| Et | Et | —CH$_2\phi$ | Cl | 75 | 250 | 3.3 |
| Et | Et | —CH$_2$CH$_2$OH | Br | 142 | ca. 500 | ca. 3.5 |
| i—Pr | i—Pr | Me | Br | 100 | ca. 500 | ca. 5.0 |
| —(CH$_2$)$_5$— | | Et | Br | 75 | >200 | >2.7 |

On the above table, $ED_{50}$ is the dose that was effective in 50% of the animals tested. $LD_{50}$ is the dose that was fatal in 50% of the animals tested and T.I. is the therapeutic index.

What is claimed is:

1. Quaternary ammonium salts having the formula

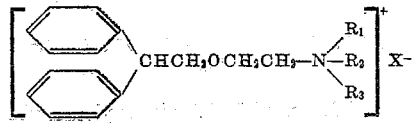

in which $R_1$ and $R_2$ taken singly are alkyl radicals having less than four carbon atoms and which together with the nitrogen atom form a piperidinium ring, $R_3$ is selected from the group consisting of lower alkyl, lower hydroxyalkyl, lower alkenyl and benzyl, and X is a halide ion selected from the group consisting of chlorine, bromine and iodine.

2. A process for the production of a quaternary ammonium salt having the formula

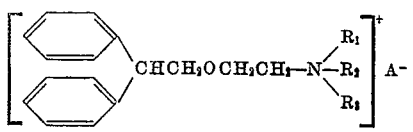

in which $R_1$ and $R_2$ taken singly are alkyl radicals having less than four carbon atoms and which together with the nitrogen atom form a piperidinium ring, $R_3$ is selected from the group consisting of lower alkyl, lower hydroxyalkyl, lower alkenyl and benzyl, and A is a non-toxic anion, which comprises stirring and refluxing an anhydrous solution of a metallic salt of 2,2-diphenyl ethanol with a dialkylaminoethyl halide selected from the group consisting of chloride, bromide and iodide; extracting the dialkylaminoethyl ether so formed with ether; treating the extract so obtained with a compound selected from the group consisting of alkyl halides, alkyl sulfates and alkyl sulfonates in a solvent at a temperature of about 25° C. to 80° C. and isolating from the reaction mixture the compound having the structure

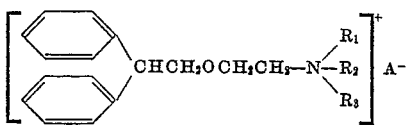

3. A compound having the formula

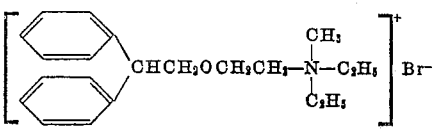

4. A compound having the formula

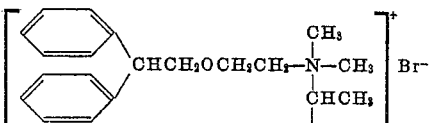

5. A compound having the formula

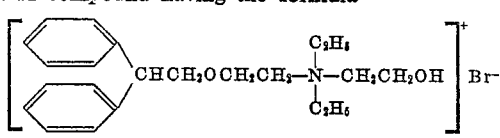

6. A compound having the formula

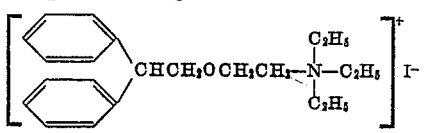

7. A compound having the formula

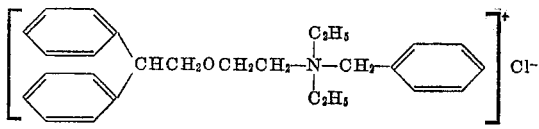

8. A compound having the formula

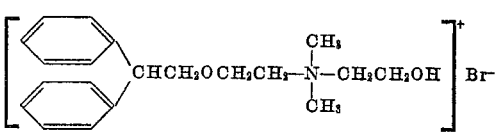

9. A compound having the formula

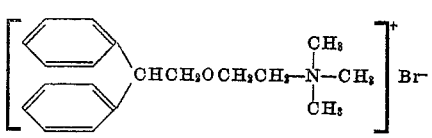

10. A compound having the formula

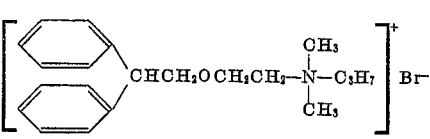

11. A compound having the formula

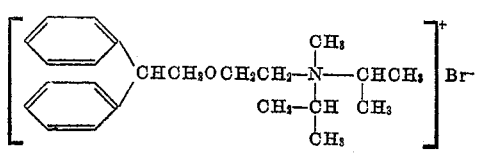

References Cited in the file of this patent
UNITED STATES PATENTS

| | | |
|---|---|---|
| 2,453,729 | Rieveschl | Nov. 16, 1948 |
| 2,454,092 | Rieveschl | Nov. 16, 1948 |
| 2,508,422 | Rieveschl | May 23, 1950 |
| 2,532,292 | Cusic | Dec. 5, 1950 |
| 2,703,324 | Binkley et al. | Mar. 1, 1955 |
| 2,751,588 | Levy | June 19, 1956 |

OTHER REFERENCES

Protiva: Chem. Abstracts, vol. 42, p. 8187 (1948).
Borovicka et al.: Chem. Abstracts, vol. 45, p. 577 (1951).
Matti et al.: 45 Chem. Abst., 8486 (1951).
Exner, Protiva and Pliml: Chem. Abstracts, vol. 49, p. 1664 (1955).
Protiva: Chem. Abstracts, vol. 49, pp. 247–249 (1955).